United States Patent
Rossetti et al.

(10) Patent No.: US 7,555,222 B2
(45) Date of Patent: Jun. 30, 2009

(54) MULTIFORMAT TRANSMITTER

(75) Inventors: Damiano Rossetti, Milan (IT); Carlo Tosetti, Sondrio (IT); Giuseppe Pietro Ravasio, Bergamo (IT)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 11/275,977

(22) Filed: Feb. 8, 2006

(65) Prior Publication Data

US 2007/0183791 A1 Aug. 9, 2007

(51) Int. Cl.
H04J 14/02 (2006.01)
H04B 10/04 (2006.01)

(52) U.S. Cl. .................. 398/183; 398/91; 398/185; 398/198

(58) Field of Classification Search .............. 398/90, 398/91, 183, 185, 198
See application file for complete search history.

(56) References Cited

U.S. PATENT DOCUMENTS

2004/0076439 A1* 4/2004 Lee et al. ............... 398/183
2004/0202134 A1* 10/2004 Khawand .................. 370/332
2004/0223766 A1* 11/2004 Lanne et al. .............. 398/183
2007/0080833 A1* 4/2007 Yabuno et al. ............ 341/58

* cited by examiner

Primary Examiner—Dalzid Singh
(74) Attorney, Agent, or Firm—Edell, Shapiro & Finnan, LLC (57) ABSTRACT

Methods and apparatus for supporting a plurality of modulation formats using a single transmitter are disclosed. According to one aspect of the present invention, a transmitter arrangement that provides a signal to a modulator that creates an optical data stream from the signal includes an encoder and a switching/filtering arrangement. The encoder has a state that is varied between first and second encoder states. If the state is the first encoder state, the encoder encodes the signal in a format associated with an optical duobinary (ODB) modulation format. Otherwise, the encoder does not encode the signal in the format associated with the ODB modulation format. The switching/filtering arrangement receives the signal from the encoder, and provides the signal to the modulator. If the variable state of the encoder is the first encoder state, the switching/filtering arrangement has a low bandpass configuration. Otherwise, the switching/filtering arrangement has a high bandpass configuration.

20 Claims, 6 Drawing Sheets

MULTIFORMAT TRANSMITTER

BACKGROUND OF THE INVENTION

1. Field of Invention

The present invention relates generally to networks. More particularly, the present invention relates to a multiformat transmitter that may be used in a network to select a transmission format such as either a non-return to zero transmission format or an optical duobinary transmission format as appropriate given performance requirements within the network.

2. Description of the Related Art

A non-return to zero (NRZ) modulation format is a typical modulation format that is used in networks such as deployed networks. A NRZ modulation format is a format in which digital data transmission uses binary low and high states that could be transmitted through electrical or optical media. Optical NRZ transmissions are often characterized by poor dispersion robustness, thus requiring dispersion compensation techniques to improve NRZ modulation format robustness to the total amount of chromatic dispersion residual associated with the deployed networks.

In lieu of implementing a dispersion compensation technique to overcome the relatively poor dispersion robustness associated with an NRZ modulation format, an optical duobinary (ODB) modulation format may be used in a network. The use of an ODB modulation format may improve the application range of an uncompensated network. An ODB modulation format is generally cost effective, relatively easy to implement, and achieves large group velocity dispersion. However, when low chromatic dispersion residual values are present, an ODB modulation format is characterized by a poorer performance than a NRZ modulation format. Hence, the use of an ODB modulation format does not always result in a better performance than the use of a NRZ modulation format.

In order to improve the performance associated with deployed networks, electronic dispersion compensation (EDC) may be applied both to an ODB modulation format, in presence of low chromatic dispersion residual values, and to a NRZ modulation format, when dealing with high dispersion residuals. The use of EDC may be effective, but EDC is not always reliable. Further, compensators that implement EDC consume a relatively high amount of power, and incorporating EDC with a forward error correction (FEC) algorithm is often complicated.

Therefore, what is needed is a readily implemented, relatively inexpensive system which allows for a good performance for a given modulation format over a range of chromatic dispersion residual values. That is, what is desired is a method and apparatus which allows the benefits associated with both an ODB modulation format and a NRZ modulation format to be realized in a single transmission system.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Non-return to zero (NRZ) transmissions are generally characterized by relatively poor dispersion robustness. To overcome the poor dispersion robustness associated with NRZ transmissions, an optical duobinary (ODB) modulation format may be used in lieu of a NRZ modulation format. However, in the presence of low dispersion chromatic residual values, the ODB modulation format has a performance that is poorer than that of the NRZ modulation format. Though the use of electronic dispersion compensation (EDC) may be effective in improving the performance associated with the NRZ and ODB modulation formats or modes, EDC is often unreliable, difficult to implement, and utilizes a relatively large amount of power.

Effectively merging the advantages associated with NRZ and ODB technologies allows for a NRZ modulation format to be used when the NRZ modulation format is characterized by a better performance than an ODB modulation format, and for an ODB modulation format to be used when the ODB modulation format is characterized by a better performance than a NRZ modulation format. In one embodiment, for a relatively low chromatic dispersion residual, a NRZ modulation format is used while for a relatively high chromatic dispersion residual, an ODB modulation format is used. A NRZ modulation format may be used to effectively exploit the better back-to-back, e.g., without propagation fiber between a transmitter and a receiver, sensitivity associated with the NRZ modulation format, and an ODB modulation format may be used to effectively exploit the higher chromatic dispersion robustness associated with the ODB modulation format. By allowing either a NRZ mode or an ODB mode to be selected, e.g., based on the value of chromatic dispersion residual, transmission may occur with a relatively high performance level for substantially all chromatic dispersion residuals. The ability to switch between a NRZ mode and an ODB mode may be implemented using a switchable or multiformat transmitter arrangement that provides NRZ or ODB optical signals.

In one embodiment, and electrical signal may be split into two paths before feeding a modulator. One path, which may be suitable for a NRZ format, may include substantially only a fixed output electrical driver. The other path, which may be suitable for an ODB format, may include an ODB fixed encoder, a fixed low-pass/low-bandwidth filter that is arranged at approximately three GigaHertz (GHz) in a 10

Gibabit per second (Gb/s) transmission system, and a fixed output electrical driver. The two paths may converge to an RF switch which routes the appropriate signal, namely either the ODB or the NRZ signal, to the modulator.

A signal path may, in some cases, be provided as a single path to a modulator. Such a path may include a variable state ODB encoder, a variable output voltage driver and a variable filter. The encoder may have a variable state that is varied between a first encoder state and a second encoder state. If the variable state is a first encoder state, the encoder encodes the signal in a format associated with an ODB modulation format. If the variable state is a second encoder state, the encoder does not encode the signal in the format associated with the ODB modulation format, and the signal is instead suitable for a NRZ format. If the variable state of the encoder is the first encoder state, the variable filter may be in a low band pass configuration at approximately three GHz in a 10 Gb/s transmission system, and the driver output voltage may be relatively high. When the variable state of the encoder is the first encoder state, an ODB signal feeds the modulator. Alternatively, if the variable state of the encoder is the second encoder state, the variable filter may be in high band pass configuration at approximately ten GHz in a 10 Gb/s transmission system, and the driver output voltage may be relatively low. In such a case, a NRZ signal feeds the modulator. The variable filter may be realized in a variety of different ways. For example, the variable filter may use micro stripes filters with concentrated variable capacitors whose capacitance is adjustable via reverse voltage, or using two radio frequency (RF) switches which route the signal through a standard low bandwidth pass band filter in an ODB mode or directly to the modulator in a NRZ mode.

Figure 1:
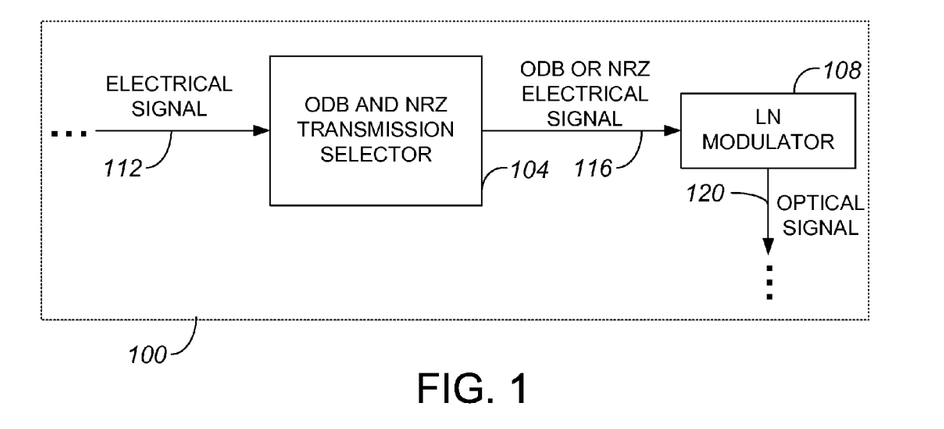
FIG. 1 is a block diagram representation of a line card that includes a transmission selector in accordance with an embodiment of the present invention.

With reference to FIG. 1, a switchable transmitter arrangement that is suitable for enabling more than one signal format to be transmitted will be described in accordance with an embodiment of the present invention. A line card 100 includes a transmission selector 104 and a modulator 108 that is generally arranged to convert an electrical signal 116 that contains data into an optical signal 120 that contains the same data. In the described embodiment, modulator 108 is a LiNbO3 (LN) modulator that uses a LiNbO3 crystal, although it should be appreciated that modulator 108 may generally be any suitable modulator.

Transmission selector 104 is arranged to receive the electrical signal 112 which, once converted in the optical domain, has to be sent in the network and to effectively select one format for the electrical signal to send to modulator 108. Transmission selector 104 may include any number of encoders, drivers, or filters, if appropriate, that allow electrical signals 112 to be processed prior to being sent to modulator 108. Modulator 108 may use either a NRZ modulation format or an ODB modulation format as appropriate to create optical signal 120. Drivers associated with transmission selector 104 may effectively be associated with different types of transmissions, e.g., a NRZ transmission or an ODB transmission. Electrical signal 116 is associated with the type of transmission selected using transmission selector 104. Hence, when transmission selector 104 selects between a NRZ transmission and an ODB transmission, electrical signal 116 is either a signal associated with a NRZ mode or a signal associated with an ODB mode.

Using transmission selector 104 in line card 100 allows advantages of both NRZ and ODB technologies to be realized. Transmission selector 104 is arranged to effectively select either a NRZ technology or an ODB technology, depending on which technology is most advantageous in a particular situation. In general, for higher chromatic dispersion residual values, an ODB mode may be selected while for lower chromatic dispersion residual values, an NRZ mode may be selected.

Figure 2A:
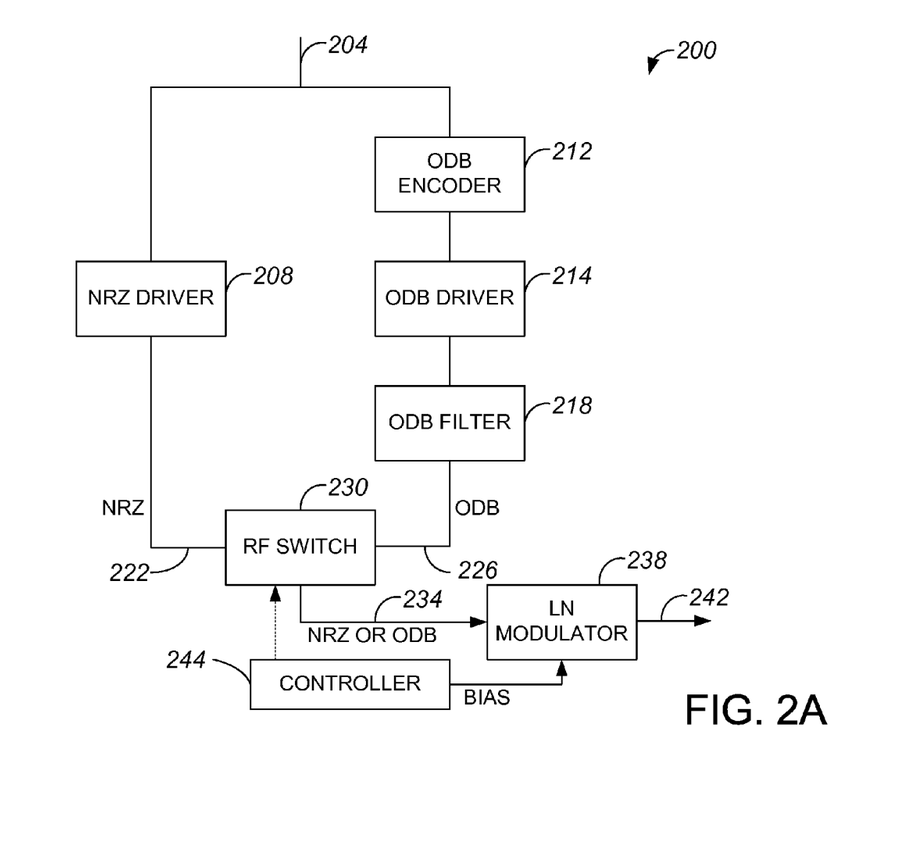
FIG. 2A is a block diagram representation of a transmission selector with two paths into a radio frequency (RF) switch that provides a signal to a modulator in accordance with an embodiment of the present invention.

Transmission selector 104 may have a variety of different configurations. For example, transmission selector 104 may be arranged to include a single switch such as a RF switch that may be used to select between a NRZ mode and an ODB mode. FIG. 2A is a block diagram representation of a transmission selector with two paths into an RF switch that provides an electrical signal to a modulator in accordance with an embodiment of the present invention. An overall transmission system 200, which may be included in a line card, includes a line 204 which is arranged to provide a signal along two paths, e.g., a first path that is arranged to support NRZ transmissions and a second path that is arranged to support ODB transmissions.

Line 204 provides a signal to a NRZ driver 208 along the first path and provides the same signal to an ODB encoder 212 along the second path. NRZ driver 208, which is an electrical driver that is generally arranged to output a voltage suitable to drive a modulator in NRZ mode ($V_\pi$), provides an electrical output on a line 222 that is an input to an RF switch 230. ODB encoder 212, which provides encoding to the signal provided on line 204, processes the signal and provides the signal first to an ODB driver 214 and then to an ODB filter 218. ODB encoder 212 may be arranged to differentially precode the data by introducing a definite amount of correlation between the data, in order to reduce the signal bandwidth. ODB driver 214 amplifies the ODB signal to a level suitable to drive a modulator in an ODB mode ($2V_\pi$). ODB filter 218 transforms the two level signal coming from ODB driver 214 into a three level signal, which, after passing through switch 230, drives a modulator 238 so as to obtain an optical two level signal.

The output of ODB filter 218 is a line 226 that is an input to RF switch 230. RF switch 230 is arranged to effectively process the NRZ signal on line 222 and the ODB signal on line 226 to determine which signal to output onto line 234. The signal that is provided on line 234 is sent to modulator 238 that is arranged to create an optical output 242 from the signal that is provided on line 234. Modulator 238 typically has a bias point that may be adjusted as appropriate based on a modulation format that is to be implemented. As will be appreciated by those skilled in the art, to process an NRZ signal or mode, modulator 238 may have a different bias point than the bias point that may be suitable for use in processing an ODB signal or mode. The bias point of modulator 238 may be adjusted by a controller 244. In one embodiment, controller 244 may also control RF switch 230.

RF switch 230 may output the NRZ signal onto line 234 when the NRZ signal would result in a higher performance than an ODB signal, e.g., in the presence of low dispersion chromatic residual values. RF switch 230 may instead output the ODB signal onto line 234 when the ODB signal would result in a higher performance for optical output 242. In other words, RF switch 230 is arranged to select the most appropriate signal from between a NRZ signal and an ODB signal.

RF switch 230 may generally be any suitable switch. By way of example, RF switch 230 may include a single pole double throw (SPDT) switch such as a GaAs SPDT switch. One suitable GaAs SPDT switch is the MASW20000 component available from M/A-COM of Lowell, Mass. The MASW20000 component is arranged to have an operating frequency range between DC and approximately 20 GHz.

Figure 2B:
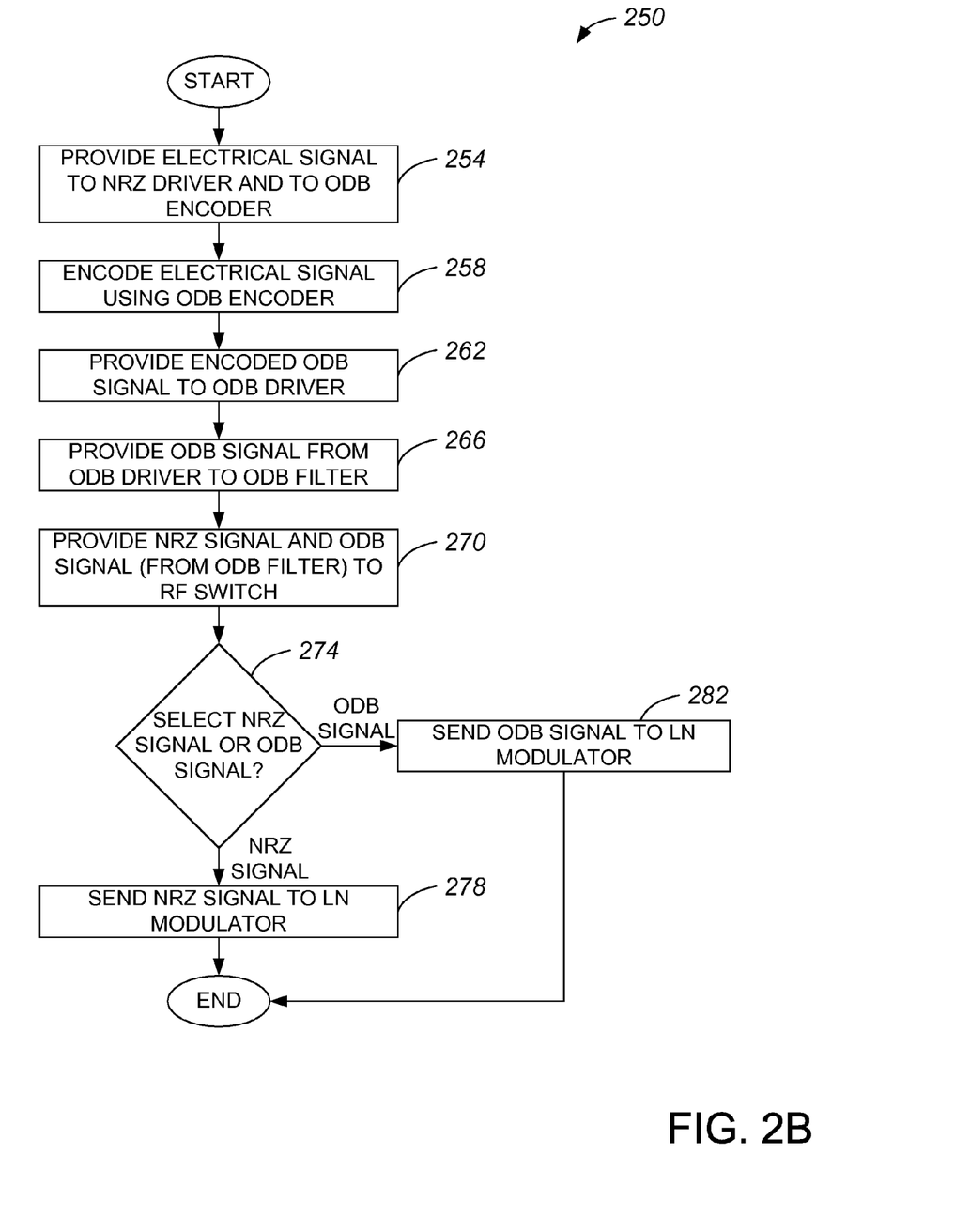
FIG. 2B is a process flow diagram which illustrates one method of utilizing a multiformat transmission system with paths associated with separate formats in accordance with an embodiment of the present invention.

Referring next to FIG. 2B, one method of using overall transmission system 200 of FIG. 2A will be described in accordance with an embodiment of the present invention. A method 250 of utilizing a transmitter arrangement that includes an RF switch that switches two paths into a single path begins at step 254 in which an electrical signal is provided to both a NRZ driver and to an ODB encoder. That is, as previously described, an electrical signal sent on two paths.

In step 258, the electrical signal that is sent to the ODB encoder is encoded using the ODB encoder. Once encoded, the encoded signal is provided to an ODB driver in step 262. The ODB driver is generally a driver with approximately twice the drive voltage associated with a NRZ driver. The ODB driver sends or otherwise provides the encoded ODB signal to an ODB filter in step 266.

After the ODB filter processes the encoded ODB signal, the filtered ODB signal is provided to an RF switch in step 270, as is an NRZ signal which is provided by the NRZ driver. A determination is then made in step 274 regarding whether the NRZ signal or the filtered ODB signal is to be selected. Such a determination may be based on a variety of different factors which include, but are not limited to, the bandwidth that is most appropriate under particular situations and the total chromatic dispersion residual. By way of example, when chromatic dispersion total residual has a magnitude of approximately 1000 picoseconds per nanometer (ps/nm) or less, transmitting a NRZ signal allows for higher receiver sensitivity. For short hauls of less than approximately 1000 ps/nm in magnitude, the receiver sensitivity associated with a NRZ modulation format is improved by approximately 2.5 decibels (dB) over the receiver sensitivity associated with an ODB modulation format. Alternatively, when chromatic dispersion total residual has a magnitude of greater than approximately 1000 ps/nm or for higher dispersion values in general, transmitting an ODB signal allows for higher receiver sensitivity. For long hauls, e.g., hauls of over approximately 1000 ps/nm, an improvement of up to approximately 2000 ps/nm is realized using an ODB modulation format in lieu of an NRZ modulation format.

In general, the RF switch may be arranged to be set, e.g., by a controller or a computing system, to select either the NRZ signal or the filtered ODB signal. If the determination in step 274 is that the filtered ODB signal is to be selected, then the filtered ODB signal is sent to an LN modulator in step 282, and the process of utilizing the transmitter arrangement is completed. Alternatively, if the determination in step 274 is that the NRZ signal is to be selected, then the NRX signal is sent in step 278 to the LN modulator, and the process of utilizing the transmitter arrangement is completed.

An overall transmission system which uses two paths that are provided to a switch, as described above with respect to FIG. 2A, is effective in allowing a selection of either a NRZ mode or an ODB mode to be made based on whichever mode would result in the best performance for the transmission system. However, the use of an RF switch and more than one driver may not be practical in some instances, as for example when space on a line card or a board is limited. In lieu of using a switch to select from between an NRZ path and an ODB path that is provided to the switch, an overall transmission system may use a single path which employs components with variable states.

Figure 3A:
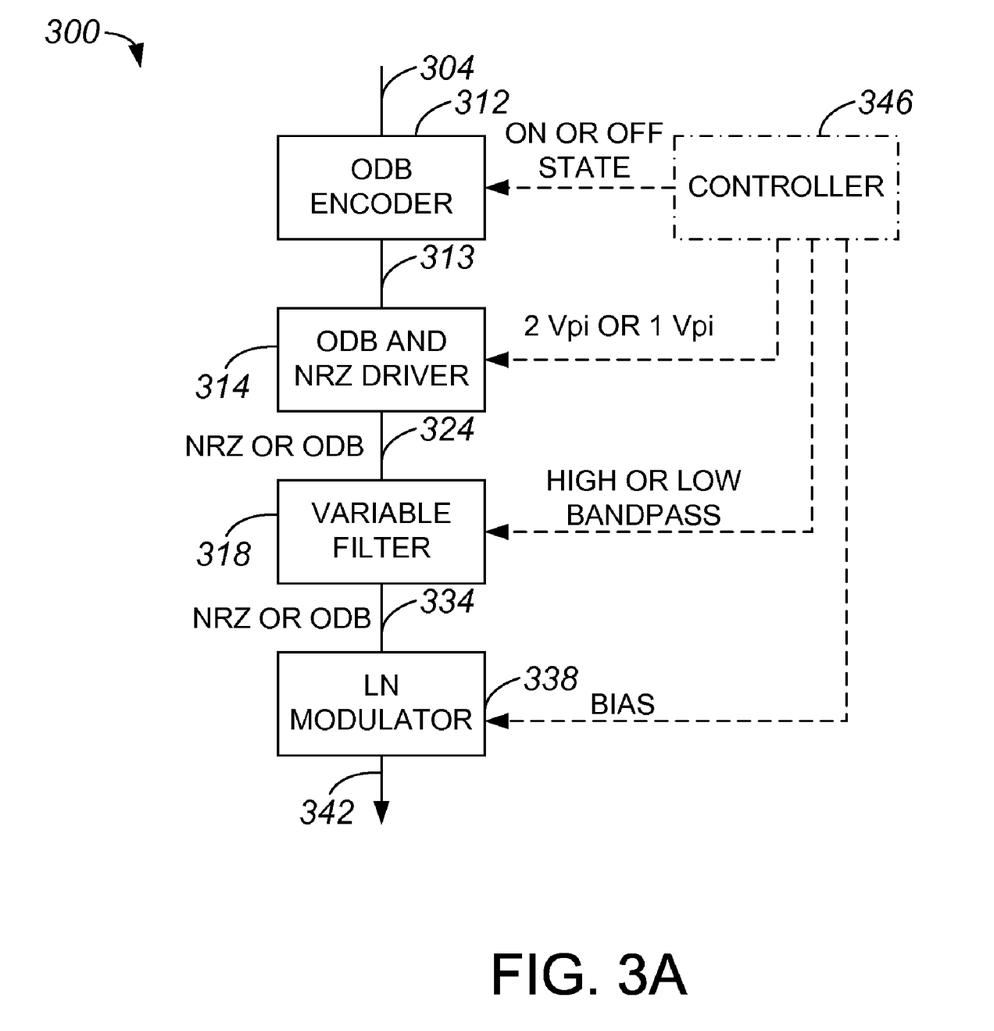
FIG. 3A is a block diagram representation of a transmission selector with a single path and a variable filter that provides a signal to a modulator in accordance with an embodiment of the present invention.

FIG. 3A is a block diagram representation of a transmission selector without RF switches that provides an electrical signal to a modulator in accordance with an embodiment of the present invention. An overall transmission system 300 includes a transmissions line 304 which provides a signal to an ODB encoder 312. A controller 346, which may be a standalone controller or a part of a controller arrangement of an overall computing system, is arranged to substantially control ODB encoder 312. That is, controller 346 effectively switches ODB encoder 312 between an "on" state and an "off" state. When in an "on" state, ODB encoder 312 encodes a signal received on line 304. ODB encoder 312 may be in an "on" state when an ODB mode is appropriate. If an NRZ mode is appropriate, ODB encoder 312 may be in an "off" state such that a signal passes through ODB encoder 312 substantially without being encoded. Controller 370 may be arranged to monitor the signal on line 304 to ascertain whether an ODB mode or an NRZ mode is to be used to transmit the signal.

From ODB encoder 312, a signal passes through a transmissions line 313 to a driver 314. Driver 314 is an electrical driver with a variable output, e.g., driver may amplify a signal by a variable amount. In one embodiment, driver 314 is arranged to be controlled by controller 346 such that when an ODB mode is appropriate, driver 314 has a particular drive voltage and when a NRZ mode is appropriate, driver 314 has another particular drive voltage. Generally, the drive voltage associated with an ODB mode is approximately double the drive voltage for an NRZ mode.

From driver 314, the signal is passed via a transmission line 324 to a variable filter 318. Filter 318 may be controlled by controller 346 to act as a high bandpass filter or a low bandpass filter, depending upon the type of filtering that is desired. An ODB mode may utilize low band pass filtering, while a NRZ mode may utilize high band pass filtering. High bandpass filtering may be arranged to enable a signal with a bandwidth of approximately ten GHz, in a 10 Gb/s transmission system, to pass, while low bandpass filtering may be arranged to enable a signal with a bandwidth of approximately three GHz, in a 10 Gb/s transmission system, to pass. It should be appreciated that the bandwidths that pass through filter 318 may be widely varied depending upon any number of factors including, but not limited to, the type of overall transmission system that filter 318 is associated with. The implementation of filter 318 may vary widely. In one embodiment, filter 318 may be implemented using micro stripes filters with concentrate variable capacitors, whose capacitance is adjustable via reverse voltage. A variable capacitor may be a low-voltage variable capacitance diode, and a capacitance value may be a function of an applied voltage. Filter 318 is arranged to be tuned to achieve a desired bandwidth or, more specifically, to allow signals of particular bandwidths to pass. The particular bandwidths that pass may be varied such that filter 318 may serve as either a high bandpass filter or a low bandpass filter.

An example of a suitable filter 318 is a filter that may include a varactor diode such as the MA46H120 GaAs Constant Gamma FlipChip varactor diode available from M/A-COM of Lowell, Mass. In general, a varactor diode may include an integrated circuit chip that is characterized by a large capacitance change relative to an applied or tuning voltage.

A transmission line 334 allows the filtered signal to be passed to a modulator 338. A bias point of modulator 338 may be adjusted as appropriate based on whether the signal passed to modulator 338 is associated with an ODB mode or with a NRZ mode. Controller 346 may be arranged to adjust the bias point of modulator 338. Modulator 338 creates an optical output 342 by effectively converting an electrical data signal into an optical data stream.

Figure 3B:
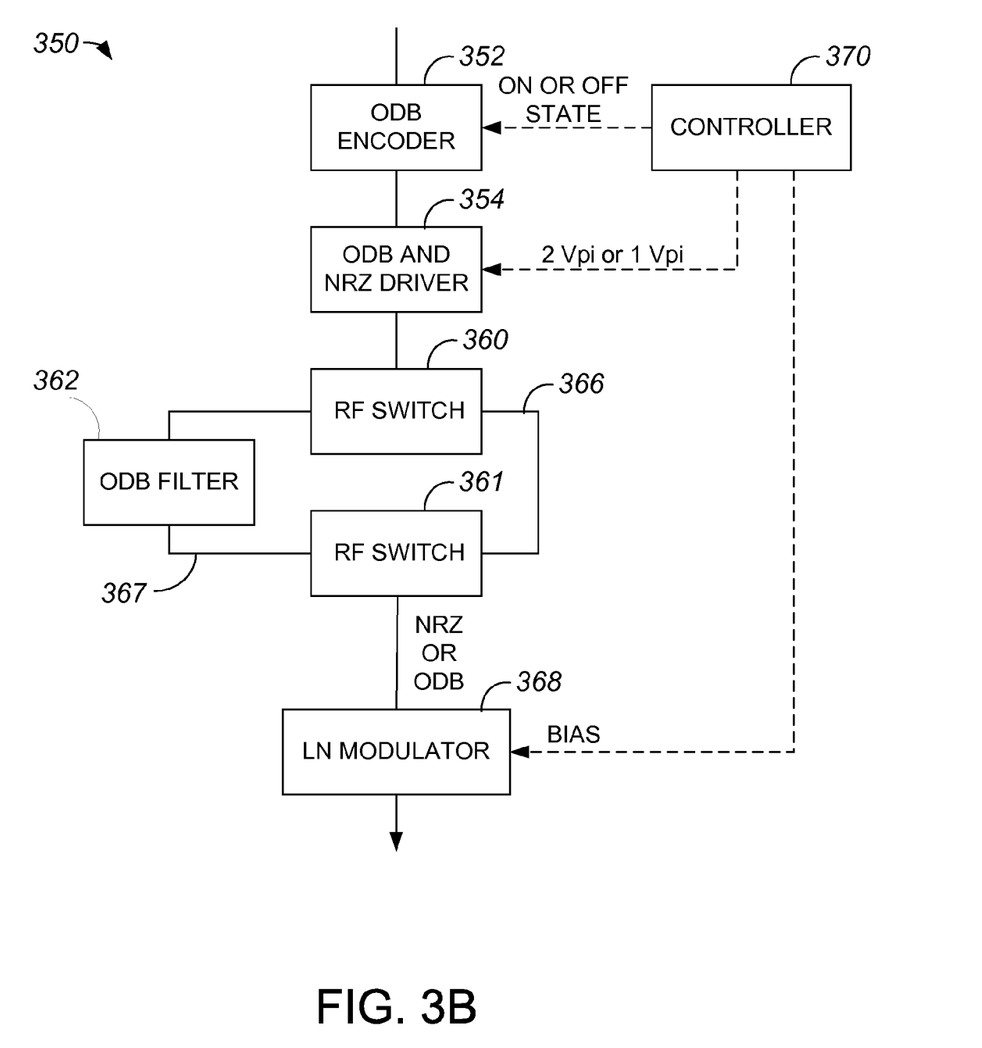
FIG. 3B is a block diagram representation of a transmission selector with a substantially single path and a two switches arrangement in accordance with an embodiment of the present invention.

Although filter 318 is suitable for filtering a signal to achieve a desired bandwidth, in lieu of using a filter in a transmission system that includes a substantially single path for both an ODB mode and a NRZ mode, a plurality of RF switches and a fixed low-bandwidth/low-pass filter may instead be used. With reference to FIG. 3B, a transmission system which includes a single driver and a pair of switches will be described in accordance with an embodiment of the present invention. An overall transmission system 300 includes an ODB encoder 352 to which a signal is sent or otherwise provided. ODB encoder 352, which may be controlled by a controller 370, is arranged to either be in an "on" state or in an "off" state. When in an "on" stage, ODB encoder 352 encodes a signal that is to be transmitted in an ODB mode. If ODB encoder 352 is in an "off" state, then a signal is to be transmitted in a NRZ mode. As such, the signal passes through ODB encoder 352 substantially without being encoded.

From ODB encoder 342, the signal passes to a driver 354 that is arranged to amplify the signal. The actual gain and, hence, the actual output level of the driver may be controlled by controller 370, and typically varies depending upon whether the signal is to be transmitted in an ODB mode or in a NRZ mode. The signal that is the output of driver 354 is provided to a first RF switch 360. If the signal is to be transmitted in a NRZ mode, the signal is simply routed from first RF switch 360 to a second RF switch 361 via a transmission line 366. Otherwise, if the signal is to be transmitted in an ODB mode, RF switch 360 sends the signal to a fixed low-bandwidth/low-pass filter 362. Filter 362 may have a bandwidth of approximately 3 GHz in a 10 Gb/s transmission system, though the bandwidth of filter 362 may vary widely. The output signal from filter 362 feeds RF switch 361 via a transmission line 367.

The output of RF switch 361 is provided to a modulator 368. Modulator 368 is arranged to create an optical output, and has a bias point that is adjusted, e.g., by controller 370, according to whether the signal that is inputted into modulator 368 is an ODB signal or a NRZ signal.

Figure 3C:
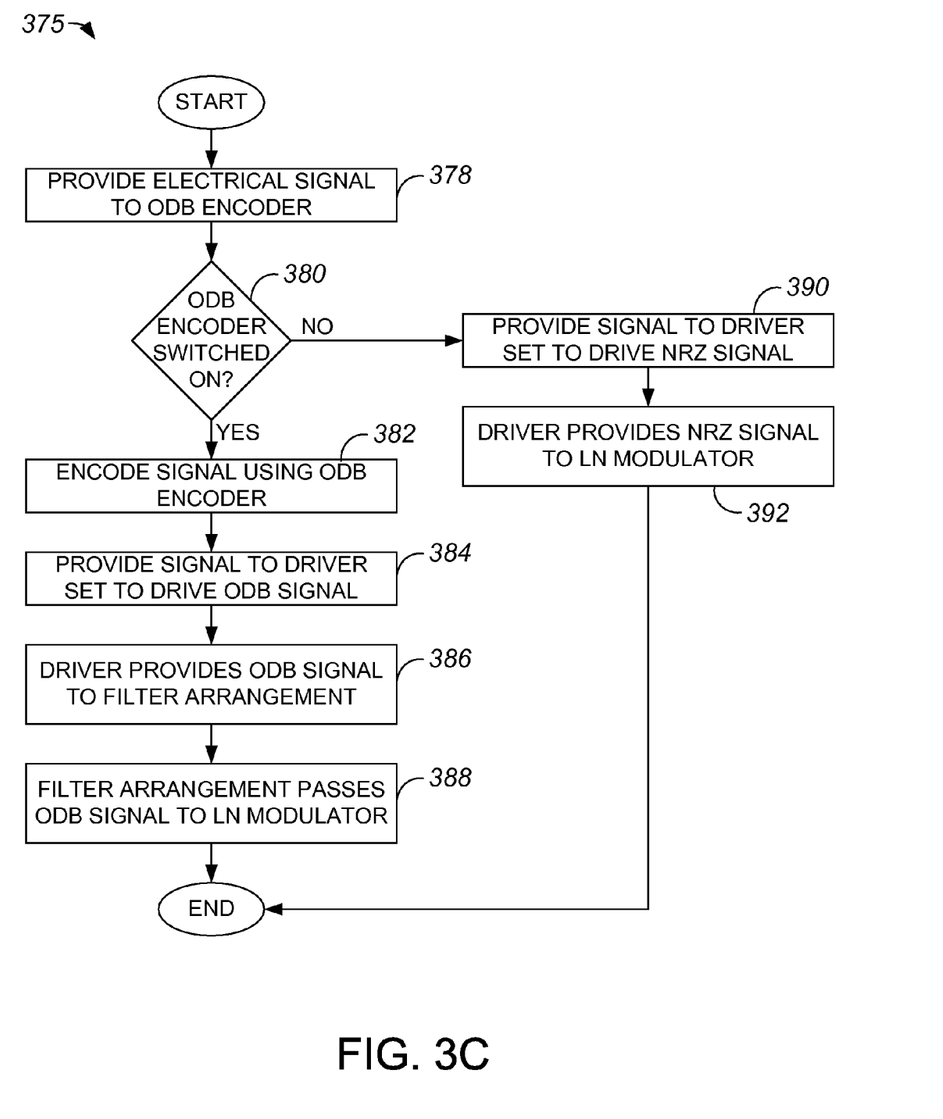
FIG. 3C is a process flow diagram which illustrates one method of utilizing a multiformat transmission system with a shared path for different formats in accordance with an embodiment of the present invention.

Referring next to FIG. 3C, the steps associated with one method of processing an electrical signal using an overall transmission system that includes a shared path for both an ODB mode and a NRZ mode will be described in accordance with an embodiment of the present invention. A method 375 of processing an electrical signal begins at step 378 in which an electrical signal is provided to an ODB encoder in step 378. The ODB encoder is arranged to either be in an "on" state or in an "off" state. A determination is made in step 380 as to whether the ODB encoder is switched "on." If the ODB encoder is switched "on," then the indication is that the signal is to be transmitted in an ODB mode. That is, the indication is that the performance associated with an ODB mode is anticipated to be better than the performance associated with a NRZ mode. As such, process flow moves from step 380 to step 382 in which the signal is encoded using the ODB encoder. Once the signal is encoded, the signal is provided to a driver in step 384 that is set to effectively drive the ODB signal.

The driver provides the signal to a filter arrangement that includes a fixed low-bandwidth/low-pass filter which, in one embodiment, has a bandwidth of approximately 3 GHz when the overall transmission system is a 10 Gb/s transmission system in step 386. The filter then passes the signal, i.e., the ODB signal, to an RF switch of the filter arrangement. The filter arrangement then provides the ODB signal to a LN modulator in step 388, and the process of utilizing the transmitter arrangement is completed.

Returning to step 380, if it is determined that the ODB encoder is not switched on, the implication is that a NRZ mode is expected to result in a better performance than an ODB mode. Accordingly, process flow moves to step 390 in which the signal is provided to a driver that is set to drive an NRZ signal. The driver that is set to drive the NRZ signal is the same driver that, in step 384, is set to drive an ODB signal. In other words, a single driver may be arranged to be controlled such that different drive voltages may be applied by the driver depending upon whether the driver is effectively set to operate in an ODB mode or in an NRZ mode. After the signal is provided to the driver in step 390, the driver drives the NRZ signal and provides the NRZ signal directly to an RF switch and, then, to a LN modulator in step 392.

In general, an RF switch may be arranged to be set, e.g., by a controller or a computing system, to select either a NRZ signal or a filtered ODB signal. If the determination in step 380 is that the ODB signal is to be selected, then the ODB signal is eventually sent to an LN modulator in step 388. Alternatively, if the determination in step 380 is that the NRZ signal is to be selected, then the NRZ signal is eventually sent in step 392 to the LN modulator.

Figure 4:
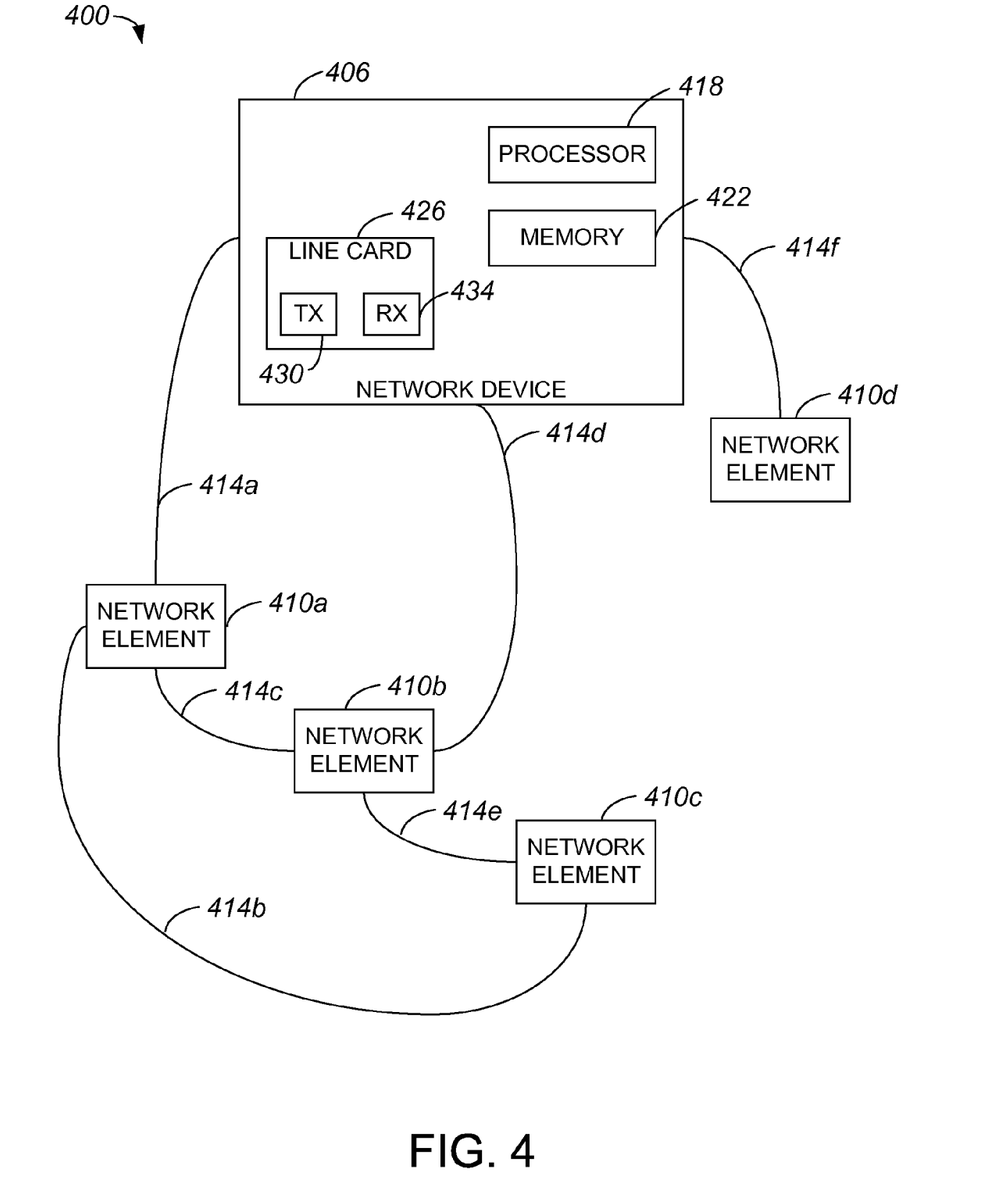
FIG. 4 is a block diagram representation of a network within which a multiformat transmitter arrangement may be implemented.

A transmission system that includes a multiformat transmitter arrangement which allows a selection to be made between an ODB mode and an NRZ mode may be implemented as a part of a network device within a network, e.g., an optical network. FIG. 4 is a block diagram representation of a network within which a multiformat transmitter arrangement of the present invention may be implemented. A network 400 may be a deployed network that includes a network device 406 in which a line card 426 is included. Line card 426 generally includes a transmitter 430 and a receiver 434. Transmitter 430 is a multiformat transmitter that allows a signal to be transmitted in one of a plurality of formats. In the described embodiment, transmitter 430 is arranged to allow a selection to be made between an ODB signal and a NRZ signal such that the signal that is the most appropriate is transmitted by line card 430. The signal that is most appropriate may be determined using any suitable criterion, e.g., a determination of whether an ODB signal or a NRZ signal is to be transmitted may be based on a desired bandwidth or a chromatic dispersion total residual that the signal should deal with.

The network device 406 may also include various components such as a processor 418 and a memory 422. In general, network device 406 may be substantially any device which may contain a line card, e.g., a computing device such as a client or a server, or a router. As network device 406 is included in network 400, network device 406 may be in either direct or indirect communication with any number of network elements 410a-d. In one embodiment, transmissions from any of network elements 410a-d may be received on receiver 434, while transmissions to any of network elements 410a-d may be generated from transmitter 430. Communications links 414a-f allow network device 406 to communicate with network elements 410a-d. While the configuration of communications links 414a-f may vary widely, as network 400 is an optical network, communications links 414a-f typically include fiber optic cables or optical fibers.

Although only a few embodiments of the present invention have been described, it should be understood that the present invention may be embodied in many other specific forms without departing from the spirit or the scope of the present invention. By way of example, while a modulator that is a part of a multiformat transmitter has been described as being an LN modulator, the modulator may be substantially any suitable modulator that enables electrical signals to be converted to optical signals. Similarly, switches that are a part of a transmission system or a multiformat transmitter are not limited to being RF switches. That is, substantially any switch which is capable of switching electrical signals may be used as switches within a transmission system.

Each component that is a part of a transmission system may include its own controller. In other words, separate controllers or separate controller arrangements may be implemented to control the components of a transmission system. For instance, an ODB encoder that may be switched between an "on" state and an "off" state may include a controller that monitors an input signal to the ODB encoder to ascertain whether the ODB encoder should be switched "on" or "off."

The steps associated with the methods of the present invention may vary widely. Steps may be added, removed, altered, and reordered without departing from the spirit of the scope of the present invention. Therefore, the present examples are to be considered as illustrative and not restrictive, and the invention is not to be limited to the details given herein, but may be modified within the scope of the appended claims.

The invention claimed is:

1. A transmitter arrangement, the transmitter arrangement being arranged to provide a signal to a modulator, the modulator being arranged to create an optical data stream from the signal, the transmitter arrangement comprising:
    an encoder, the encoder having a variable state, the variable state of the encoder being arranged to be varied between a first encoder state and a second encoder state, wherein if the variable state of the encoder is the first encoder state, the encoder encodes the signal in a format associated with an optical duobinary (ODB) modulation format, and wherein if the variable state of the encoder is the second state, the encoder does not encode the signal in the format associated with the ODB modulation format; and
    a switching/filtering arrangement, the switching/filtering arrangement being arranged to be varied between a low bandpass configuration and a high bandpass configuration, the switching/filtering arrangement further being arranged to receive the signal from the encoder and to provide the signal to the modulator, wherein if the variable state of the encoder is the first encoder state, the switching/filtering arrangement is arranged in the low bandpass configuration, and wherein if the variable state of the encoder is the second encoder state, the switching/filtering arrangement is arranged in the high bandpass configuration.

2. The transmitter arrangement of claim 1 wherein the switching/filtering arrangement includes two radio frequency (RF) switches and a fixed low-bandwidth/low-pass filter, the two RF switches being arranged to route the signal through the filter, if an ODB mode for the two RF switches has been selected, or not to route the signal through the filter, if a non-return to zero (NRZ) mode for the two RF switches has been selected.

3. The transmitter arrangement of claim 1, wherein the switching/filtering arrangement is a variable filter, and wherein the low bandpass configuration is a low bandpass filter configuration and the high bandpass configuration is a high bandpass filter configuration.

4. The transmitter arrangement of claim 3 wherein the low bandpass configuration is an ODB configuration and the high bandpass configuration is a non-return to zero (NRZ) configuration.

5. The transmitter arrangement of claim 3 wherein the variable filter includes micro stripe filters and variable capacitance diodes.

6. The transmitter arrangement of claim 3 further including:
    a variable driver arrangement, the variable driver arrangement being arranged to apply a drive voltage to the signal, the drive voltage having a first value when the variable state of the encoder is the first encoder state and a second value when variable state of the encoder is the second encoder state, the variable driver arrangement further being arranged to obtain the signal from the encoder and to provide the signal to the variable filter.

7. The transmitter arrangement of claim 6 further including:
    a controller arrangement, the controller arrangement being arranged to vary the variable state of the encoder and an output voltage of the driver, the controller arrangement further being arranged to select between the low bandpass filter configuration and the high bandpass filter configuration.

8. The transmitter arrangement of claim 3 wherein when a chromatic dispersion total residual associated with the signal has a magnitude of less than approximately 1000 ps/nm, the variable filter is arranged in the high bandpass filter configuration and the signal is in a format associated with a non-return to zero (NRZ) modulation format.

9. The transmitter arrangement of claim 3 wherein when a chromatic dispersion total residual associated with the signal has a magnitude of greater than approximately 1000 ps/nm, the variable filter is arranged in the low bandpass filter configuration and the signal is in the format associated with the ODB modulation format.

10. The transmitter arrangement of claim 3 wherein the variable filter includes a varactor diode.

11. A transmitter arrangement, the transmitter arrangement being arranged to provide a signal to a modulator, the modulator being arranged to create an optical data stream from the signal, the transmitter arrangement comprising:
    means for encoding the signal in a format associated with an optical duobinary (ODB) modulation format, the means for encoding the signal having a first state and a second state, wherein the first state is associated with the ODB modulation format and wherein the second associated is not associated with the ODB modulation format;
    means for alternating between first state and the second state; and
    means for alternating between a low bandpass configuration and a high bandpass configuration, the means for alternating between the low bandpass configuration and the high bandpass configuration including means for receiving the signal from the means for encoding the signal, the means for alternating between the low bandpass configuration and the high bandpass configuration further including means for providing the signal to the modulator, wherein the low bandpass configuration is in effect if the means for encoding is in the first state and the high bandpass configuration is in effect if the means for encoding is in the second state.

12. A method for providing a non-optical signal to a modulator, the modulator being arranged to create an optical data stream from the signal, the method comprising:
    determining if the signal is to be encoded in a format associated with an optical duobinary (ODB) modulation format;
    encoding the signal in the format associated with the ODB format if it is determined that the signal is to be encoded in the format associated with the ODB format;
    applying a drive voltage to the signal, wherein if the signal is encoded in the format associated with the ODB format, the drive voltage has a first value and wherein if the signal is not encoded in the format associated with the ODB format, the drive voltage has a second value; and
    determining a bandwidth of the signal to be provided to the modulator, wherein determining the bandwidth of the signal to be provided to the modulator includes providing a first bandwidth associated with the signal to the modulator if the signal is encoded in the format associated with the ODB format and providing a second bandwidth associated with the signal to the modulator if the signal is not encoded in the format associated with the ODB format.

13. The method of claim 12 wherein the signal is associated with an approximately 10 Gb/s transmission system and wherein the first bandwidth has a magnitude of approximately three GigaHertz, and the second bandwidth has a magnitude of approximately ten GHz.

14. The method of claim 12 further including providing the signal to a variable filter, wherein the variable filter determines the bandwidth of the signal to be provided to the modulator.

15. The method of claim 12 further including providing the signal to a radio frequency (RF) switch arrangement.

16. The method of claim 15 wherein the RF switch arrangement includes at least a low bandwidth filter.

17. The method of claim 16 wherein the RF switch arrangement also includes a high bandwidth filter, and wherein outputs of the low bandwidth filter and the high bandwidth filter outputs are provided to a second RF switch.

18. The method of claim 17 wherein the RF switch output of the second RF switch is provided to an optical modulator.

19. A method of creating an optical signal from an electrical signal, the method comprising:
   providing the electrical signal as an input to a selective transmission format block, the selective transmission format block being arranged to create an optical signal in a format associated with an optical duobinary (ODB) format and an optical signal in a format associated with a non-return-to-zero (NRZ) format, wherein the selective transmission format block is arranged to select one from the group including the electrical signal in the format associated with the ODB format and the electrical signal in the format associated with the NRZ format;
   providing the selected electrical signal from the selective transmission format block to a modulator; and
   creating an optical signal from the selected electrical signal.

20. A line card suitable for creating an optical signal from an electrical signal, the line card comprising:
   a selective transmission format block, the selective transmission format block being arranged to receive an electrical input signal, the selective transmission format block further being arranged to create signals of a plurality of formats from the electrical input signal, the plurality of formats including a first format associated with an optical duobinary (ODB) format and a second format associated with a non-return-to-zero (NRZ) format, wherein the selective transmission format block derives an electrical output signal from the electrical input signal, selecting from the group which includes the first format and the second format; and
   a modulator, the modulator being arranged to convert the electrical output signal into an optical signal.

* * * * *